United States Patent
Brousseau et al.

[11] Patent Number: 5,917,724
[45] Date of Patent: Jun. 29, 1999

[54] METHOD FOR PREDICTING DISK DRIVE FAILURE BY MONITORING THE RATE OF GROWTH OF DEFECTS WITHIN A DISK DRIVE

[75] Inventors: Robert P. Brousseau, Lexington; William Z. Bryan, Columbia; James M. Denosky, Charleston, all of S.C.

[73] Assignee: NCR Corporation, Dayton, Ohio

[21] Appl. No.: 08/995,432

[22] Filed: Dec. 20, 1997

[51] Int. Cl.$^6$ ........................................... G11B 7/00
[52] U.S. Cl. ............... 364/186; 364/468.15; 364/468.17; 360/48; 360/53; 369/54; 369/58
[58] Field of Search .................... 364/186, 188, 364/468.15, 468.16, 468.17, 468.22, 468.23; 360/31, 48–49, 53–54; 369/32, 54, 58

[56] References Cited

U.S. PATENT DOCUMENTS

| | | |
|---|---|---|
| 3,999,051 | 12/1976 | Petschauer ........................ 235/153 AK |
| 4,405,952 | 9/1983 | Slakmon .................................... 360/49 |
| 4,498,146 | 2/1985 | Martinez ................................ 364/900 |
| 4,814,903 | 3/1989 | Kulakowski et al. ..................... 360/48 |
| 4,821,251 | 4/1989 | Hosoya . |
| 4,821,254 | 4/1989 | Satoh et al. ............................... 369/54 |
| 4,839,879 | 6/1989 | Sawada et al. . |
| 4,935,825 | 6/1990 | Worrell et al. ............................ 360/53 |
| 4,969,139 | 11/1990 | Azumatani et al. ...................... 369/54 |
| 5,075,804 | 12/1991 | Deyring ................................... 360/49 |
| 5,237,553 | 8/1993 | Fukushima et al. ...................... 369/32 |
| 5,271,018 | 12/1993 | Chan ...................................... 371/10.2 |
| 5,475,814 | 12/1995 | Tomimitsu .......................... 395/183.06 |
| 5,644,786 | 7/1997 | Gallagher ................................ 395/850 |
| 5,646,923 | 7/1997 | Shea ........................................ 369/58 |

*Primary Examiner*—John Barlow
*Assistant Examiner*—Bryan Bui
*Attorney, Agent, or Firm*—James M. Stover

[57] ABSTRACT

A method for predicting the failure of a hard disk drive within a computer system and replacing the hard disk drive prior to an in-service failure of the disk drive. The method includes the steps of: establishing a maximum linear growth rate for the grown defect list (G-List) for the disk drive, e.g., 0.01% of the disk drive's capacity divided by the disk drive's expected service life of five years; periodically determining the number of entries contained in the grown defect list; and calculating the actual linear growth rate of the grown defect list from the number of entries contained in the grown defect list and the length of time the disk drive has been in service. Should the actual linear growth rate of the G-List exceed the maximum linear growth rate for two successive measurement periods, the disk drive will be replaced. The method may further include the steps of: establishing a maximum burst growth rate for the disk drive, for example four times the maximum linear growth rate; and calculating the actual burst growth rate of the grown defect list from the change in the number of entries contained in the grown defect list during a measurement period. Should the actual burst growth rate of the G-List exceed the maximum burst growth rate for two successive measurement periods, the disk drive will also be replaced.

10 Claims, 9 Drawing Sheets

FIG. 9

EVENT LOG output for Disk State Changes

USER ACTION: Remove Disk:

Disk (Host Adapter ID:1 SCSI ID:4 Logical Unit:0) State Change: Last state recorded: NORMAL/DISK READY  Current state: Disk Removed USER ACTION: Insert removed Disk (disk is inserted but not spun up yet):

Disk (Host Adapter ID:1 SCSI ID:4 Logical Unit:0) State Change: Last state recorded: Disk Removed Current state: Disk Failed/Not Ready Inserted Disk is spun by Disk Threshold Software and Ready:

Disk (Host Adapter ID:1 SCSI ID:4 Logical Unit:0) State Change: Last state recorded: Disk Failed/Not Ready  Current state: NORMAL/DISK READY Predicted Failure threshold (Warning/Weekly) passed:

Disk (Host Adapter ID:1 SCSI ID:1 Logical Unit:0) Threshold State Change:  Last state recorded: NORMAL/DISK READY  Current state: WARNING: PREDICTED FAILURE: Upper GLIST Weekly Warning Threshold Exceeded for Disk

FIG. 12

| Disk Grown List Thresholds JOKER | | | ☒ |
|---|---|---|---|
| Host Adapter : SCSI ID : Logical Unit | 1 : 1 : 0 | | |
| Detailed Status: | WARNING - Weekly Glist Size Increase Threshold Exceeded | | |

When a disk fails or a threshold is exceeded, the associated action will occur

Event Generation
⦿ On   ○ Off

|  | Current Value | Threshold Value |  |
|---|---|---|---|
| Disk Failed/Not Ready: | | | Actions... |
| Warning Total Entries: | 87 | 839 | Actions... |
| Warning Weekly Glist Entries: | 77 | 26 | Actions... |
| Warning Monthly Glist Entries: | 86 | 112 | Actions... |
| Monitor Weekly Glist Entries: | 77 | 13 | Actions... |
| Monitor Monthly Glist Entries: | 86 | 56 | Actions... |

Multipliers for determining threshold values

Warning Base Rate Multiplier: 8    Monitor Base Rate Multiplier: 4

[ OK ]   [ Cancel ]   [ Help ]

METHOD FOR PREDICTING DISK DRIVE FAILURE BY MONITORING THE RATE OF GROWTH OF DEFECTS WITHIN A DISK DRIVE

The present invention relates to magnetic disk storage units and, more particularly, to a method for monitoring and replacing magnetic disk storage units.

BACKGROUND OF THE INVENTION

Magnetic disk storage units, commonly referred to as hard drives, are the principal mass storage systems utilized in personal computers, servers and larger computer systems for the non-volatile storage of programs and data files. The speed, capacity and quality of modern hard drives has never been higher, yet the physical size and cost of hard drives has never been smaller. A typical hard drive today generally has a service life of five years. The construction of a hard drive, and organization of data therein, are illustrated in FIGS. 1 and 2, a discussion of which follows.

Data is organized on the surface of a magnetic disk as shown in FIG. 1. The disk drive unit includes a circular disk, referred to as a platter, 102 having its surface coated with a magnetizable material and a read/write head 104 attached to a movable arm 106. Data is recorded onto the surface of the platter in a concentric set of rings T0 through T3, called tracks. Arm 106 is movable in the directions indicated by arrows 108 to position head 104 over any one of tracks T0 through T3. Each track is seen to be divided into sections identified as sectors, wherein blocks of data are stored, each block containing 512 bytes of data. The sectors corresponding to tracks T0, T1, T2 and T3 have been numbered S0 through S9, S10 through S19, S20 through S29, and S30 through S39, respectively. A second read/write head, not shown, may be provided to provide access to the bottom surface of platter 102.

A disk stack, shown in FIG. 2, consists of multiple platter 202 through 208 affixed to a common shaft or spindle 220. Each platter is similar in construction to disk platter of FIG. 1. Multiple read/write heads H1 through H7 provide access to platter surfaces 202A, 202B, 204A, 204B, 206A, 206B, 208A and 208B, respectively. The heads are moved in unison in the directions indicated by arrows 210 to locate corresponding tracks on each platter. The corresponding concentric tracks on platters 202 through 208 are referred to as cylinders.

The platter or disk stack is rotated at constant speed during operation, typically at 7200 revolutions per minute, with each read head/write head riding over the surface of its corresponding platter on a cushion of air 1 to 2 millionths of an inch deep. To read or write information, the read/write head must be positioned contiguous to the desired track and at the beginning of the sector to be accessed. Access time includes the time it takes to position the head at the desired track or cylinder, known as seek time, and the time it takes for the head to line up with the sector to be accessed, known as rotational latency. Seek time can be eliminated by providing a fixed head for each track, but modern drives have thousands of tracks which makes this technique impractical.

During manufacture of a hard disk drive, a small number of sectors will invariably contain defects. These permanent defects are discovered during testing by the drive manufacturer and identified in a Primary Defect List (P-List) provided with the hard disk drive. All modern disk drives also include the ability to identify sectors which become damaged or doubtful during the use of the drive, and to remap the bad sectors, automatically locating a new sector to store the data otherwise stored on the bad sectors. The location of sectors identified as damaged during use following the manufacture of the disk drive are maintained in a second list referred to as a Grown Defect List (G-List).

SCSI (Small Computer Systems Interface) Hard Disks include a Read Defect Data command in which the user may read the Grown Defect List. A Grown Defect is the address of a block that has been reassigned, either automatically due to a hard media error or by the Reassign Blocks command. A G-List entry may be read in different formats, but all current NCR Corporation qualified disk drives support, at least, the Physical Sector Format: Cylinder, Head, and Sector, as defined in the SCSI-2 specification. Each reassigned block is one entry in the G-List. G-List entries are not time stamped. Several utilities are available that may be used to read the G-List. For example, FIG. 3 provides a windowed display of the primary and grown defect lists for a SCSI hard drive generated by Adaptec, Incorporated's. SCSI Interrogator program.

The total number of reassigned blocks that a disk drive can support is determined by the particular scheme that the drive manufacturer uses for the disk drive model. However, the NCR Generic Requirements Specification for 3½" SCSI Disk Drives requires that no more than 0.01% of the total number of blocks on a drive be reassigned during the service life of a disk drive. The service life is, generally, five years.

A method for identifying and replacing hard disk drives prior to drive failure is desired. It is believed that in many cases, a potential hard disk drive failure can be identified by monitoring the growth of the Grown Defect List for the disk drive.

OBJECTS OF THE INVENTION

It is therefore an object of the present invention to provide a new and improved method for identifying potential hard disk drive failures and replacing hard disk drives prior to a drive failure.

It is another object of the present invention to provide such a method which monitors the rate of growth in the size of the Grown Defect Lists corresponding to one or more hard disk drives to identify potential hard disk drive failures.

SUMMARY OF THE INVENTION

There is provided, in accordance with the present invention, a method for predicting the failure of a hard disk drive within a computer system and replacing the hard disk drive prior to an in-service failure of the disk drive. The method includes the steps of: establishing a maximum linear growth rate for the grown defect list (G-List) for the disk drive; periodically determining the number of entries contained in the grown defect list; and calculating the actual linear growth rate of the grown defect list from the number of entries contained in the grown defect list and the length of time the disk drive has been in service. Should the actual linear growth rate of the G-List exceed the maximum linear growth rate during a specified period, the disk drive will be replaced. In the described embodiment, the maximum linear growth rate for the drive is set at 0.01% of the disk drive's capacity (in blocks) divided by the disk drive's expected service life of five years.

The method may further include the steps of: establishing a maximum burst growth rate for the disk drive, and calculating the actual burst growth rate of the grown defect list from the change in the number of entries contained in the grown defect list during a measurement period. Should the actual burst growth rate of the G-List exceed the maximum burst growth rate for two successive measurement periods, the disk drive will also be replaced. In described embodiment, the maximum burst growth rate is set at four times the maximum linear growth rate.

The above and other objects, features, and advantages of the present invention will become apparent from the following description and the attached drawings.

BRIEF DESCRIPTION OF THE DRAWINGS

FIG. 9 is a sample Event Log output identifying a predicted disk drive failure, generated in accordance with the present invention.

FIGS. 10 through 12 are windowed displays providing drive status and failure information, generated in accordance with the present invention.

DETAILED DESCRIPTION OF THE PREFERRED EMBODIMENT

General Predicted Failure Analysis (PFA) techniques can be applied to the information contained in the G-List in order to predict hard disk drive failures. Since the G-List entries are not time stamped, a chronological log must be maintained that can be used to determine the rate of growth of the G-List. Two PFA methods will be discussed below, namely:
1. Linear growth of the G-List
2. Burst growth rate of the G-List

Linear Growth of the G-List

Figure 1:
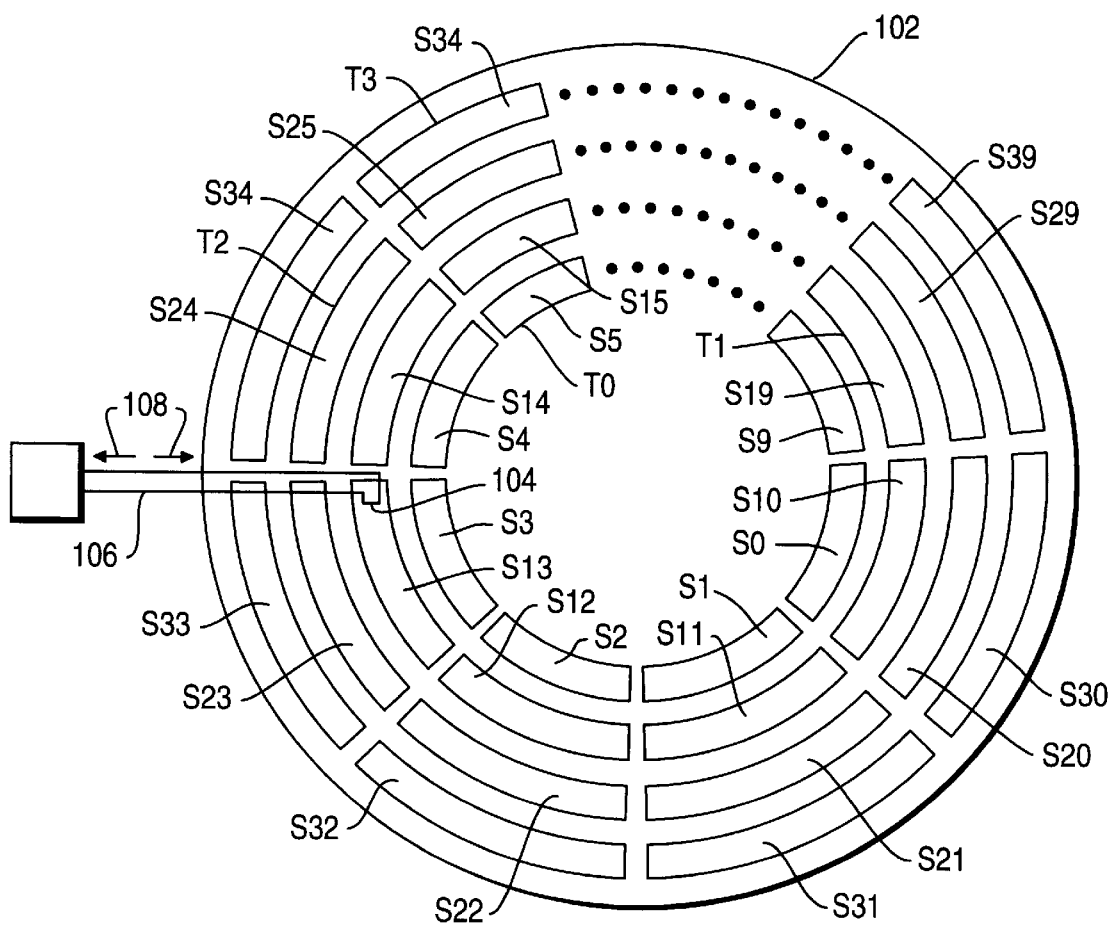
FIG. 1 is a top view of a magnetic disk illustrating the organization of data on the surface of the disk.
Figure 2:
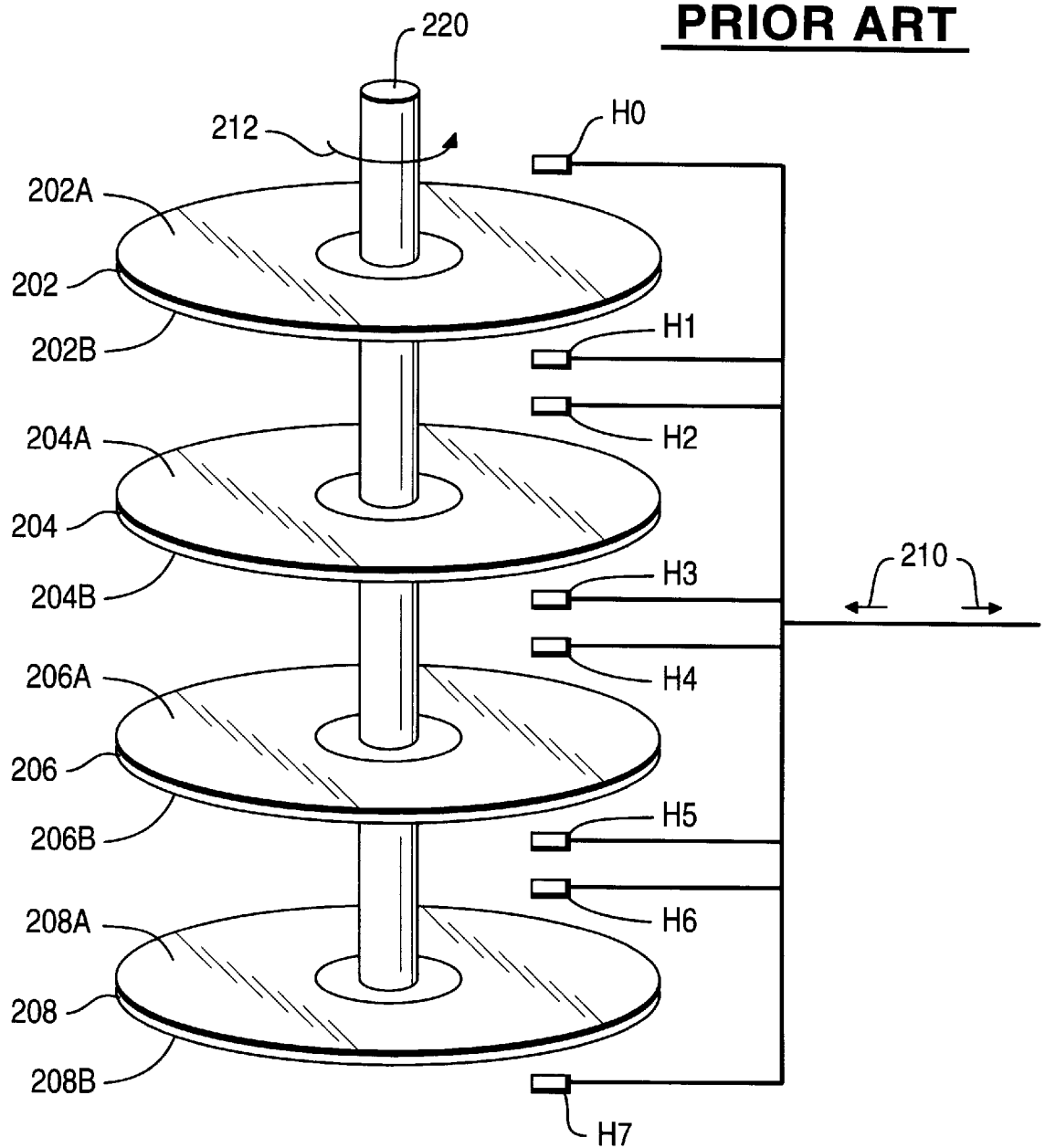
FIG. 2 is an illustration of a disk drive system including multiple platters or disks stacked on a common spindle.
Figure 3:
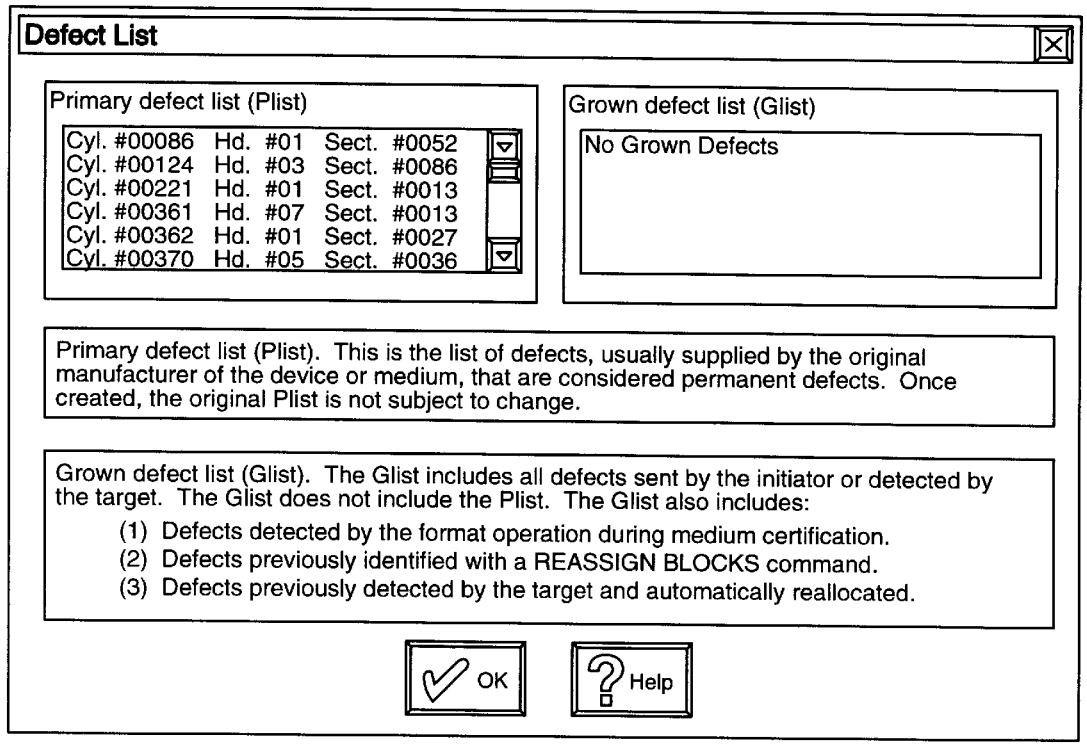
FIG. 3 is a display of the primary and grown defect lists for a SCSI hard drive provided by Adaptec, Incorporated's. SCSI Interrogator program.
Figure 4:
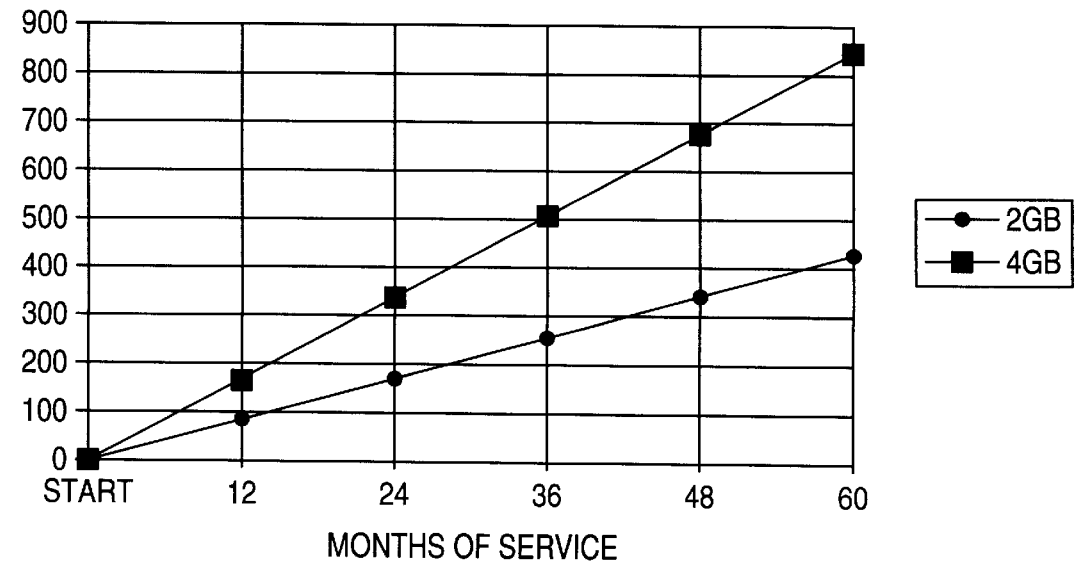
FIG. 4 is a graph illustrating the relationship between the number of entries considered acceptable within the G List for typical 2 gigabyte and 4 gigabit disk drives over the service life of the disk drives.

Since the Service Life of a typical hard disk drive is five years, and the growth of the G-List is required not to exceed 0.01% of the total number of blocks on a drive, a simple linear growth curve can be determined for each drive, relative to its capacity. For example, a 2 gigabyte (GB) hard disk drive includes 4,194,304 blocks or sectors. 0.01% of this value equals 419 blocks, the maximum allowed number of entries in the G-List for this 2 GB drive. Over 60 months, the acceptable linear rate of growth would be 7 G-List entries per month. A graph illustrating the acceptable linear growth for 2 GB and 4 GB disk drives is provided by FIG. 4.

In accordance with the present invention, the following rules concerning growth of the G-List have been established to identify potential hard disk drive failures:

Linear Growth Rule 1

If the G-List for a hard disk drive ever exceeds the number of acceptable G-List entries for the time that the drive has been in service, that drive should be placed on a Monitor status.

Linear Growth Rule 2

If a drive on Monitor status, during subsequent measurement periods, continues to experience a growth in its G-List which exceeds the predetermined basic rate of growth for the drive, the drive should be replaced.

Linear Growth Rule 3

If the number of entries contained within the G-List for a drive on Monitor status, during subsequent measurement periods, returns to a value below the acceptable number of entries for the drive's total time of operation, the drive should be returned to Normal status.

Figure 5:
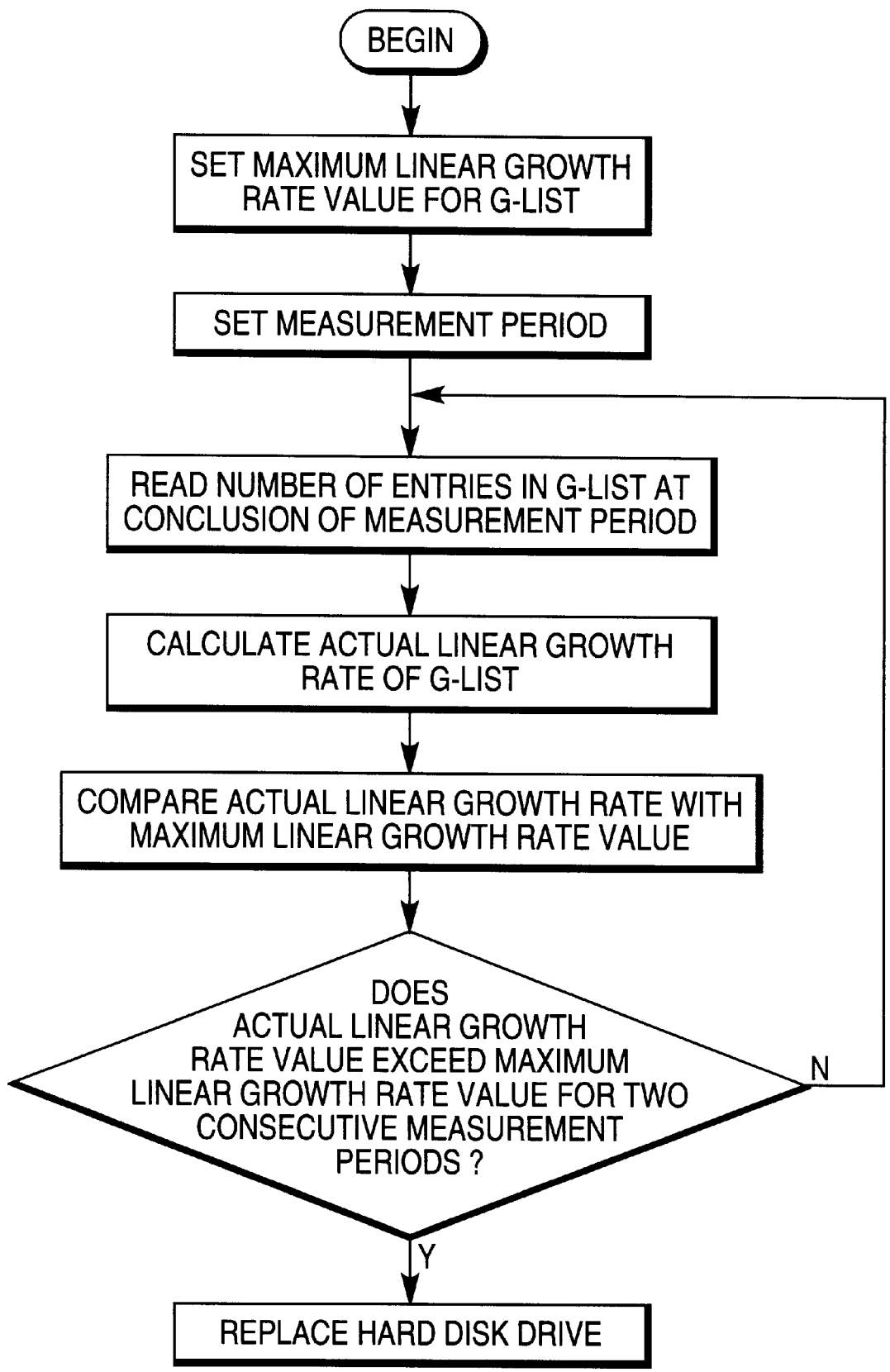
FIG. 5 is a flow diagram illustrating a method for monitoring the growth rate of the G-List of a disk drive in order to schedule replacement of the drive prior to failure in service in accordance with the present invention.

The process for monitoring the linear growth rate of the G-List of a disk drive in order to schedule replacement of the disk drive prior to the disk drive failing during service is illustrated in the flow diagram of FIG. 5.

Burst Growth Rate of the G-List

Figure 6:
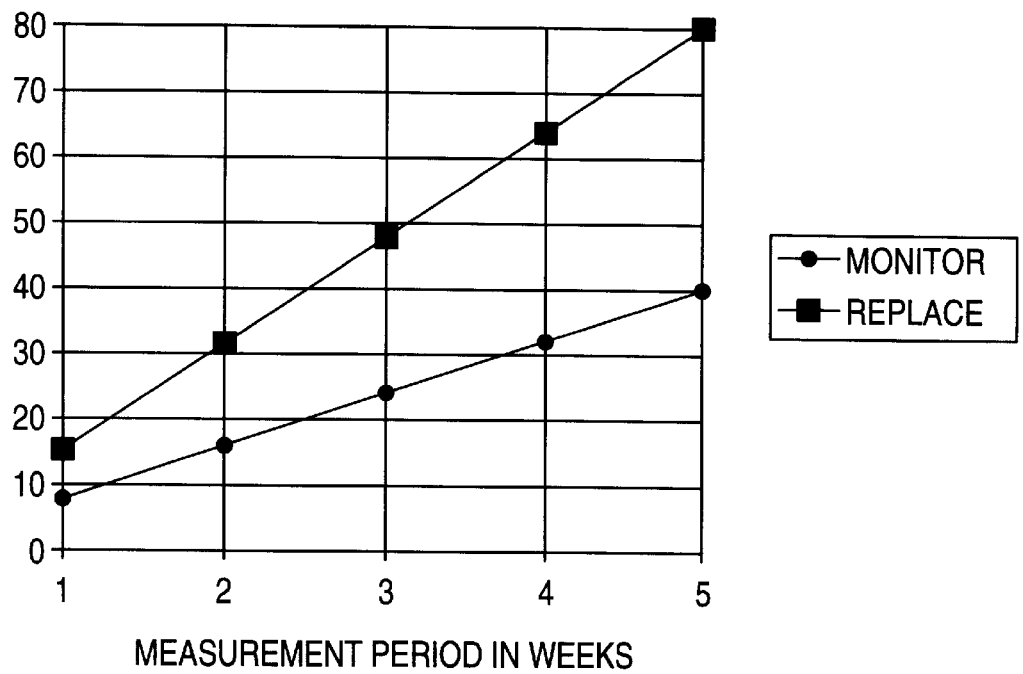
FIG. 6 is a graph illustrating the relationship between the acceptable rate of increase in the number of entries within the G List for a typical 2 gigabyte disk drive over a period of weeks.
Figure 7:
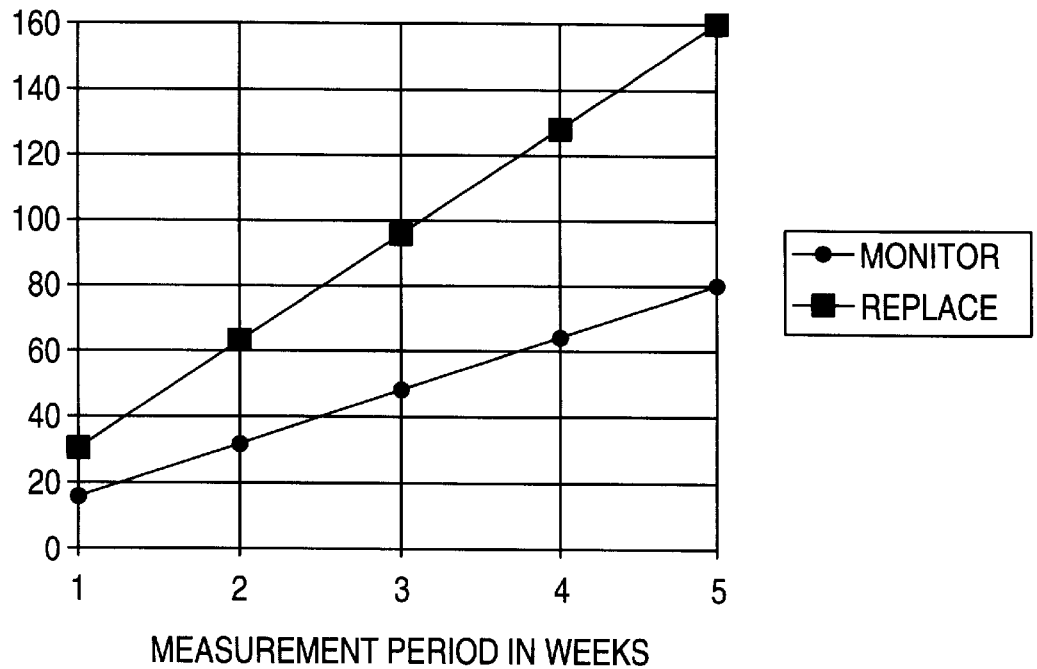
FIG. 7 is a graph illustrating the relationship between the acceptable rate of increase in the number of entries within the G List for a typical 4 gigabyte disk drive over a period of weeks.

Frequently, a drive will operate for years with little or no growth in its corresponding G-List, then experience a rapid growth in the number of G-List entries within a short period of time. This scenario may be an indication of a pending drive failure. The present invention establishes a burst growth rate threshold for a hard disk drive to which the short term "burst" growth of the drive's G-list is compared to identify a potential drive failure. In the "burst growth rules" listed below, the maximum burst growth rate is set at four to eight times the maximum linear growth rate. The graphs of FIGS. 6 and 7 illustrate the burst thresholds for 2 GB and 4 GB disk drives, respectively.

Accordingly, the following rules concerning the burst growth rate of the G-List have been established to identify potential hard disk drive failures. These threshold factors have been empirically determined.

Burst Rate Rule 1

If, during a measurement period, the growth of a drive's G-List exceeds the basic growth rate by more than four times, the drive should be placed on a Monitor status.

Burst Rate Rule 2

If the G-List for a drive on Monitor status, during subsequent measurement periods, continues to grow at the accelerated, burst growth rate, then the drive should be replaced.

Burst Rate Rule 3

If the growth rate for the G-List for a drive on Monitor status, during subsequent measurement periods, returns to a rate equal to or below the basic rate of growth, the drive should be returned to Normal status.

Burst Rate Rule 4

If during a measurement period, a drive's G-List exceeds the basic growth rate by more than eight times, the drive should be replaced.

Figure 8:
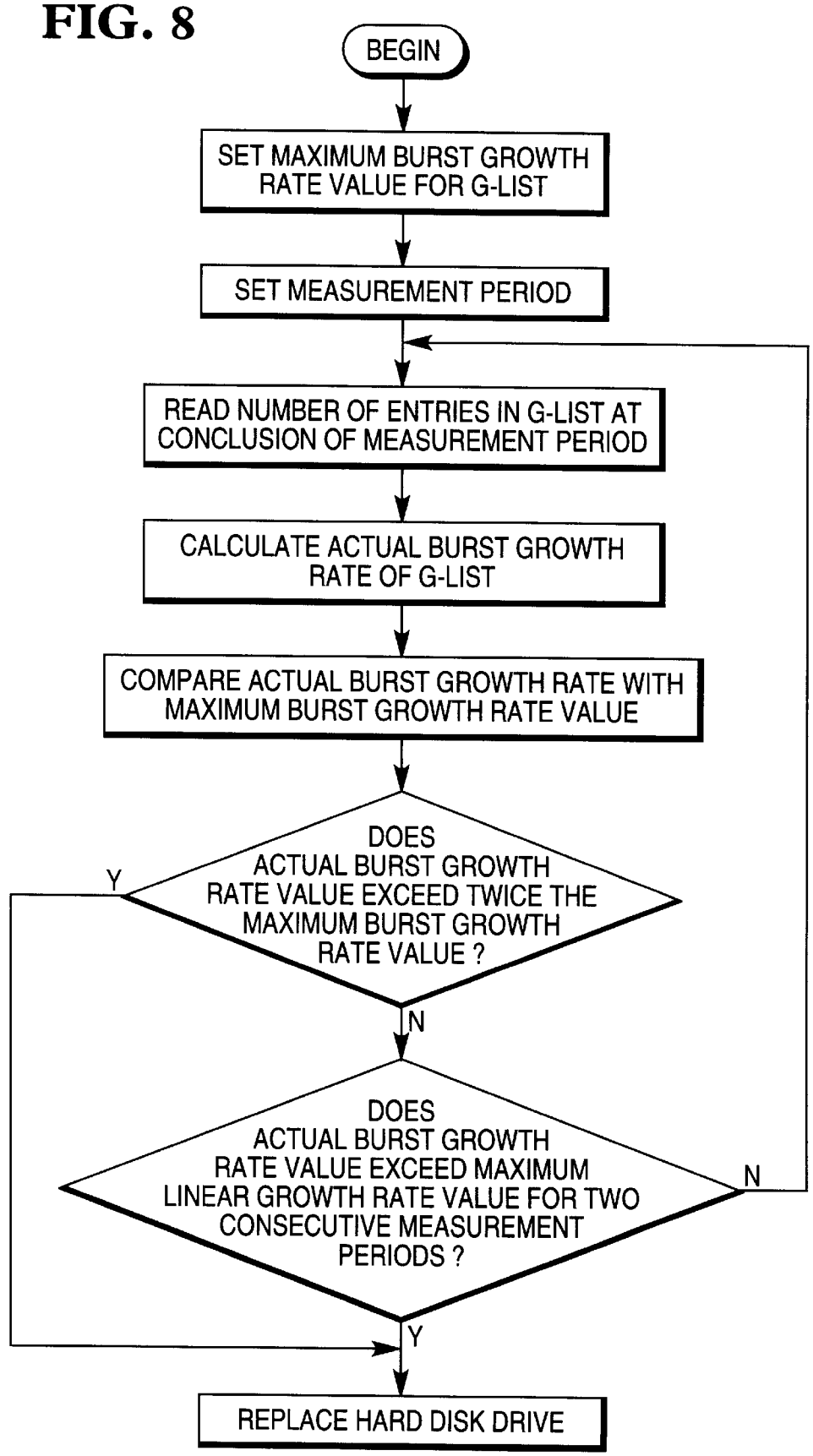
FIG. 8 is a flow diagram of illustrating a method for monitoring the burst growth rate of the G-List of a disk drive in order to schedule replacement of the drive prior to failure in service in accordance with the present invention.

The process for monitoring the burst growth rate of the G-List of a disk drive in order to schedule replacement of the disk drive prior to the disk drive failing during service is illustrated in the flow diagram of FIG. 8. The processes illustrated in the flow diagrams of FIGS. 5 and 8 are preferably executed concurrently within the disk drive system.

SUMMARY

The G-List has been in SCSI drives for several years and can be used today for Predicted Failure Analysis. The G-List is stored on the hard disk drive and, therefore, is system and operating system independent. The Rules set forth above are simple to implement and do not require a SCSI specialist to interpret. Further, the G-List analysis complements other proposed Predicted Failure Analysis schemes and can be part of a more complex failure analysis system that incorporates multiple event monitors.

Figure 10:
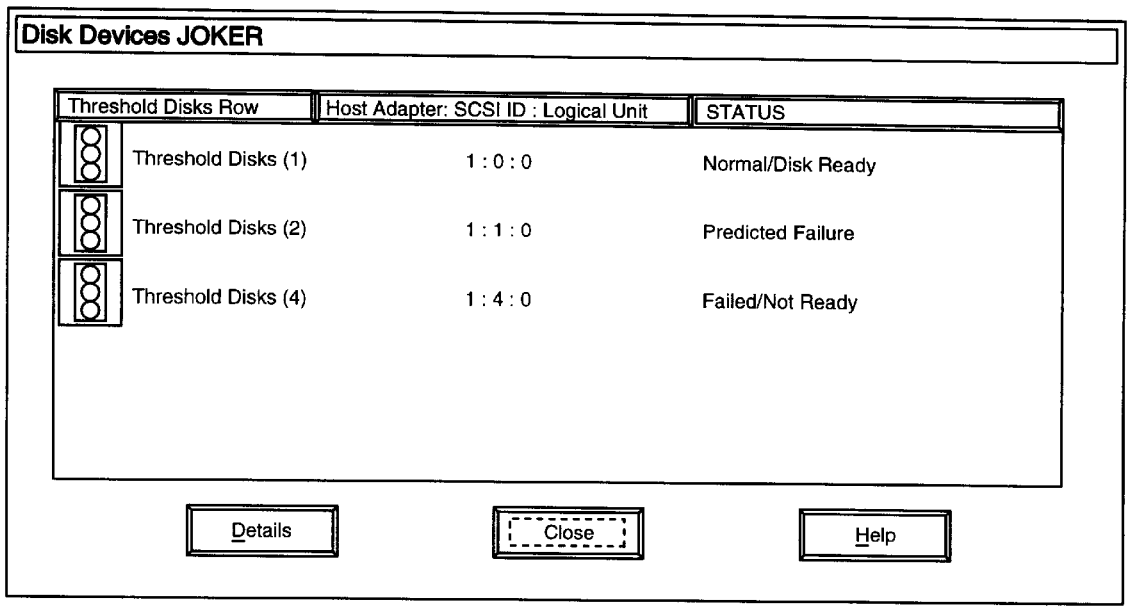
Figure 11:
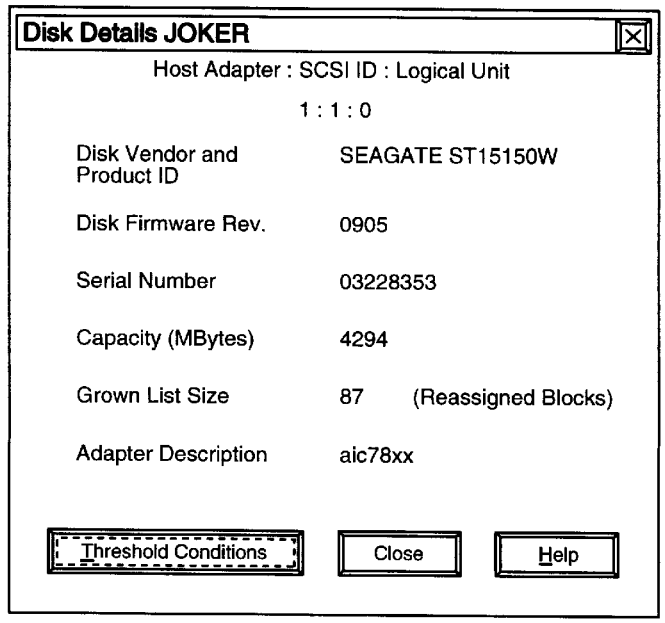

A sample Event Log output identifying a predicted disk drive failure, generated in accordance with the present invention, is provided in FIG. 9. Windowed displays providing drive status and failure information, generated in accordance with the present invention are provided in FIG. 10 through 12.

It can thus be seen that there has been provided by the present invention a method for identifying potential hard disk drive failures and replacing hard disk drives prior to a drive failure. The proposed method monitors the rate of growth in the size of the Grown Defect Lists corresponding to one or more hard disk drives to identify potential hard disk drive failures.

Although the presently preferred embodiment of the invention has been described, it will be clear to those skilled in the art that the present invention is not limited to the specific embodiment described and illustrated and that numerous modifications and changes are possible without departing from the scope of the present invention. For example, the method is not limited SCSI disk drives, or magnetic media disk drives.

These and other variations, changes, substitutions and equivalents will be readily apparent to those skilled in the art without departing from the spirit and scope of the present invention. Accordingly, it is intended that the invention to be secured by Letters Patent be limited only by the scope of the appended claims.

What is claimed is:

1. A method for predicting the failure of a hard disk drive within a computer system, said hard disk drive device including a grown defect list containing a listing of storage locations within said hard disk drive device identified as damaged during use of the hard disk drive device, said method comprising the steps of:

establishing a maximum growth rate for the grown defect list for said disk drive;

periodically determining the number of entries contained in said grown defect list;

calculating the actual growth rate of said grown defect list from the number of entries contained in the grown defect list and the length of time said disk drive has been in service; and replacing said disk drive if said actual growth rate exceeds said maximum growth rate during a specified period of time.

2. The method in accordance with claim 1, wherein:

said maximum growth rate equals 0.01% of the capacity of said disk drive divided by the service life of said disk drive.

3. The method in accordance with claim 2, wherein:

the service life of said disk drive is five years.

4. A method for predicting the failure of a hard disk drive within a computer system, said hard disk drive device including a grown defect list containing a listing of storage locations within said hard disk drive device identified as damaged during use of the hard disk drive device, said method comprising the steps of:

a) establishing a maximum growth rate for the grown defect list for said disk drive;

b) determining the number of entries contained in said grown defect list;

c) calculating an actual growth rate of said grown defect list from the number of entries contained in the grown defect list and the length of time said disk drive has been in service;

d) comparing said actual growth rate with said maximum growth rate;

e) repeating steps b) through d) at predetermined time intervals; and f) replacing said disk drive if said actual growth rate exceeds said maximum growth rate during two consecutive time intervals.

5. The method in accordance with claim 4, wherein:

said maximum growth rate equals 0.01% of the capacity of said disk drive divided by the service life of said disk drive.

6. The method in accordance with claim 5, wherein:

the service life of said disk drive is five years.

7. A method for predicting the failure of a hard disk drive within a computer system, said hard disk drive device including a grown defect list containing a listing of storage locations within said hard disk drive device identified as damaged during use of the hard disk drive device, said method comprising the steps of:

establishing a maximum burst growth rate for the grown defect list for said disk drive;

determining the number of entries contained in said grown defect list at the beginning of a predetermined measurement period;

determining the number of entries contained in said grown defect list at the conclusion of said measurement period;

calculating the actual burst growth rate of said grown defect list from the change in the number of entries contained in the grown defect list during said measurement period and the duration of measurement period; and replacing said disk drive if said actual burst growth rate exceeds said maximum burst growth rate during a specified period of time.

8. A method for predicting the failure of a hard disk drive within a computer system, said hard disk drive device including a grown defect list containing a listing of storage locations within said hard disk drive device identified as damaged during use of the hard disk drive device, said method comprising the steps of:

a) establishing a maximum burst growth rate for the grown defect list for said disk drive;

b) determining the number of entries contained in said grown defect list at the beginning of a predetermined measurement period;

c) determining the number of entries contained in said grown defect list at the conclusion of said measurement period;

d) calculating the actual burst growth rate of said grown defect list from the change in the number of entries contained in the grown defect list during said measurement period and the duration of measurement period;

e) comparing said actual burst growth rate with said maximum burst growth rate;

f) repeating steps b) through e) for consecutive measurement periods; and g) replacing said disk drive if said actual burst growth rate exceeds said maximum burst growth rate during two consecutive time intervals.

9. A method for predicting the failure of a hard disk drive within a computer system, said hard disk drive device including a grown defect list containing a listing of storage locations within said hard disk drive device identified as damaged during use of the hard disk drive device, said method comprising the steps of:

establishing a maximum linear growth rate for the grown defect list for said disk drive;

establishing a maximum burst growth rate for the grown defect list for said disk drive;

establishing a repeating measurement period and determining the number of entries contained in said grown defect list at the conclusion of each measurement period;

calculating the actual linear growth rate of said grown defect list at the conclusion of each measurement period, said actual linear growth rate being calculated from the number of entries contained in the grown defect list and the length of time said disk drive has been in service;

replacing said disk drive if said actual linear growth rate exceeds said maximum growth rate during two successive measurement periods;

calculating an actual burst growth rate of said grown defect list at the conclusion of each measurement period, said actual burst growth rate being calculated from the change in the number of entries contained in the grown defect during a measurement period; and replacing said disk drive if said actual burst growth rate exceeds said maximum growth rate during two successive measurement periods.

10. The method in accordance with claim 9, wherein:

said maximum linear growth rate equals 0.01% of the capacity of said disk drive divided by the service life of said disk drive; and said maximum burst growth rate equals 0.08% of the capacity of said disk drive divided by the duration of said measurement period.

* * * * *